US008782759B2

(12) United States Patent
Hinton et al.

(10) Patent No.: US 8,782,759 B2
(45) Date of Patent: Jul. 15, 2014

(54) IDENTIFICATION AND ACCESS CONTROL OF USERS IN A DISCONNECTED MODE ENVIRONMENT

(75) Inventors: Heather Maria Hinton, Austin, TX (US); Anthony Joseph Nadalin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1353 days.

(21) Appl. No.: 12/029,006

(22) Filed: Feb. 11, 2008

(65) Prior Publication Data
US 2009/0205032 A1 Aug. 13, 2009

(51) Int. Cl.
G06F 7/04 (2006.01)
H04W 12/06 (2009.01)
H04L 29/06 (2006.01)

(52) U.S. Cl.
CPC .......... *H04W 12/06* (2013.01); *H04L 63/0815* (2013.01)
USPC .......... 726/7; 726/5; 726/6; 726/20; 713/168; 713/170; 713/180; 380/273; 455/411

(58) Field of Classification Search
USPC ........ 726/4–9, 29, 20; 713/159–169; 455/411
See application file for complete search history.

(56) References Cited

U.S. PATENT DOCUMENTS

| | | | |
|---|---|---|---|
| 6,247,127 B1 | 6/2001 | Vandergeest | |
| 6,886,095 B1 * | 4/2005 | Hind et al. | 713/168 |
| 6,980,660 B1 * | 12/2005 | Hind et al. | 380/282 |
| 7,139,565 B2 * | 11/2006 | Fiatal et al. | 455/423 |
| 7,373,515 B2 * | 5/2008 | Owen et al. | 713/182 |
| 7,613,299 B2 * | 11/2009 | Carroll | 380/248 |
| 7,787,863 B2 * | 8/2010 | van de Groenendaal | 455/411 |
| 7,822,983 B2 * | 10/2010 | Aull et al. | 713/172 |
| 7,882,348 B2 * | 2/2011 | Kirkup et al. | 713/158 |
| 7,917,505 B2 * | 3/2011 | van Gent et al. | 707/732 |
| 7,984,298 B2 * | 7/2011 | Wei et al. | 713/171 |

(Continued)

FOREIGN PATENT DOCUMENTS

WO  WO2004068785  8/2004

OTHER PUBLICATIONS

Seth A, Practical security for disconnected nodes, Nov. 2005, IEEE, vol. 5, pp. 31-36.*
Written Opinion, PCT/EP2009/050629, mailed May 26, 2009.

*Primary Examiner* — Shin-Hon Chen
*Assistant Examiner* — Viral Lakhia
(74) *Attorney, Agent, or Firm* — Jeffrey S. LaBaw; David H. Judson (57) ABSTRACT

The present invention provides identification and access control for an end user mobile device in a disconnected mode environment, which refers generally to the situation where, in a mobile environment, a mobile device is disconnected from or otherwise unable to connect to a wireless network. The inventive method provides the mobile device with a "long term" token, which is obtained from an identity provider coupled to the network. The token may be valid for a given time period. During that time period, the mobile device can enter a disconnected mode but still obtain a mobile device-aided function (e.g., access to a resource) by presenting for authentication the long term token. Upon a given occurrence (e.g., loss of or theft of the mobile device) the long term token is canceled to restrict unauthorized further use of the mobile device in disconnected mode.

17 Claims, 3 Drawing Sheets

(56) References Cited

U.S. PATENT DOCUMENTS

| | | | |
|---|---|---|---|
| 8,260,262 B2* | 9/2012 | Ben Ayed | 455/411 |
| 8,353,451 B2* | 1/2013 | Rothwell et al. | 235/380 |
| 8,364,968 B2* | 1/2013 | Corcoran et al. | 713/182 |
| 2003/0014633 A1 | 1/2003 | Gruber | |
| 2003/0026426 A1 | 2/2003 | Wright et al. | |
| 2004/0006713 A1* | 1/2004 | Minemura | 713/201 |
| 2004/0039919 A1* | 2/2004 | Takayama et al. | 713/180 |
| 2006/0002556 A1 | 1/2006 | Paul | |
| 2006/0015725 A1 | 1/2006 | Voice et al. | |
| 2006/0123485 A1* | 6/2006 | Williams | 726/27 |
| 2006/0179305 A1* | 8/2006 | Zhang | 713/168 |
| 2006/0206709 A1* | 9/2006 | Labrou et al. | 713/167 |
| 2007/0186105 A1* | 8/2007 | Bailey et al. | 713/168 |
| 2007/0198734 A1* | 8/2007 | Knowles et al. | 709/230 |
| 2007/0208936 A1* | 9/2007 | Ramos Robles | 713/168 |
| 2008/0059804 A1* | 3/2008 | Shah et al. | 713/186 |
| 2008/0130547 A1* | 6/2008 | Won et al. | 370/312 |
| 2009/0300738 A1* | 12/2009 | Dewe et al. | 726/6 |
| 2010/0146274 A1* | 6/2010 | Naslund et al. | 713/168 |
| 2013/0012126 A1* | 1/2013 | Fisher et al. | 455/41.1 |
| 2013/0035035 A1* | 2/2013 | Fisher | 455/41.1 |

* cited by examiner

Figure 6

IDENTIFICATION AND ACCESS CONTROL OF USERS IN A DISCONNECTED MODE ENVIRONMENT

BACKGROUND OF THE INVENTION

1. Technical Field

The present invention relates generally to access control in a mobile environment.

2. Background of the Related Art

A "mobile device" is any wireless client device, such as a cell phone, a pager, a personal digital assistant, a mobile computer with a smart phone client, or the like. A typical mobile device is a wireless access protocol (WAP)-enabled device that is capable of sending and receiving data to and from a connected network in a wireless manner. WAP supports numerous wireless networks, and it operates with many handheld device operating systems. Typically, WAP-enabled devices use graphical displays and can access the Internet (or other communication network) on so-called mini-or microbrowsers, which are web browsers with small file sizes that can accommodate the reduced memory constraints of handheld devices and the low-bandwidth constraints of a wireless networks. A typical mobile device is a cellular telephone that operates over GPRS (General Packet Radio Service), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known wireless data formats. Mobile devices are being used as the client device for more and more "online" types of activities, such as browsing the Internet, checking e-mail, file download, and the like. Mobile device usage also is being extended to support more localized activity, such as charging for purchases of products or services (e.g., from a vending machine, a fuel pump, or the like), or as a client proximity device (e.g., to open a garage door, to access a physical premise or locked enclosure, or the like).

BRIEF SUMMARY OF THE INVENTION

The disclosure herein provides identification and access control for an end user mobile device in an identity provider-disconnected mode environment, which refers generally to the situation where, in a mobile environment, a mobile device is disconnected from or otherwise unable to connect to an identity provider. In one embodiment, the disclosed method provides the mobile device with a "long term" token, which is a token obtained from a provider (e.g., an identity provider) in response to the identity provider's authentication of the user and that is useful to facilitate identity and privilege assertion to other parties. As is well-known, authentication is a process of verifying a user's identity. The long term token provided by the identity provider typically is a "single sign-on" (SSO) token, used to assert the user's authenticated identity (and/or associated attributes) to service provider partners, where this token may be valid for a given time period. During that time period, the identity provider can enter a disconnected mode; however, the user of that mobile device still can obtain a identity provider-aided function (e.g., access to a facility, access to a resource, purchase of a given product or service, subscription to a service, or the like) by presenting the long term token for authentication/single sign-on (and receiving an acceptable response from a trusted entity).

In particular, and according to one embodiment, when a mobile device is turned on and a user authenticates to an identity provider, the identity provider provides the mobile device with a token that is usable to obtain authentication and access to services when the mobile device is operating in an identity provider-disconnected mode environment. An identity provider may be a network provider, but this is not a requirement. Preferably, the token is stored in a persistent data store of the mobile device. The duration of the token may be set in various timeframes, such as one (1) day, one (1) week, or the like. If desired, the timeframe may be defined by a "not-for-use before a first date and time" value together with a "not-for-use after a second date and time" value. This identity provider token is used by the mobile device when the user/mobile device needs to provide an identity provider token (or an equivalent) as part of an identity provider-disconnected mode operation. This token is sometimes referred to herein as a "long term" token to contrast that it is intended to be usable (theoretically) during time periods when the mobile device is not then connected to the identity provider. Typically, the token is not used when the mobile device is operating in connected mode, i.e. when the mobile device is connected to the identity provider. In connected mode, the application typically is able to leverage the network to request from the identity provider a fresh token, e.g., as generated at request time for the use at an appropriate connected application. The long term token that is used in identity provider-disconnected mode may not be associated with the same level of privileges as provided with a one-time-use token generated and used in connected mode The "long term" token may be generated in any convenient manner by the identity provider. Although not meant to be limiting, preferably the identity provider is implemented as a service that provides identity information to other entities within a so-called "federated" computing environment, which is an environment wherein a set of distinct entities (such as enterprises, organizations, institutions, and the like) cooperate to provide a single-sign-on, ease-of-use experience to a user. A federated environment differs from a typical single-sign-on environment in that two enterprises need not have a direct, pre-established, relationship defining how and what information to transfer about a user. Within a federated environment, entities provide services that deal with authenticating users, accepting authentication/single sign-on assertions (e.g., authentication/single sign-on tokens) that are presented by other entities, and providing some form of translation of the identity of the vouched-for user into one that is understood within the local entity. Where the identity provider is part of a federated environment, the token is generated by an entity such as a Security Token Service (STS). An STS typically is capable of accepting and validating many different authentication credentials, including traditional credentials such as a username and password combinations and Kerberos tickets, as well as federated authentication token formats, including authentication tokens produced by a third party.

According to another feature of the subject disclosure, an entity, such as an Security Token Service (STS), is able to signal the cancellation of the long-term token upon a given occurrence, such as receipt of a notification that a user's mobile device has been stolen or is otherwise lost. This ensures that the device cannot be used to facilitate a mobile device-aided function in identity provider-disconnected mode without the authorized user's authority or consent, indicated by the provisioning of a new, not-cancelled long-term token to the mobile device.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
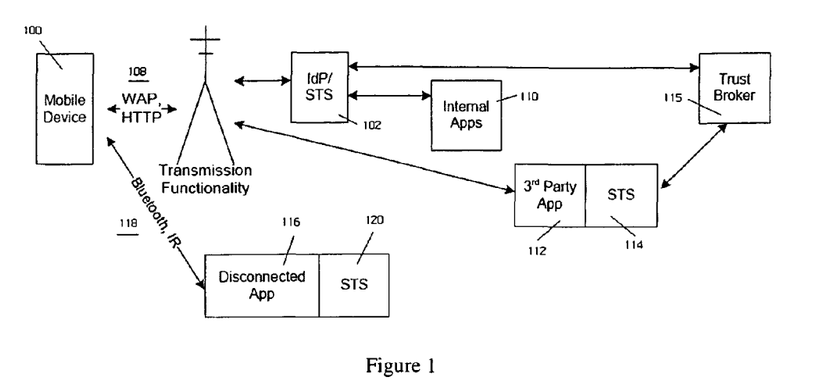
FIG. 1 depicts a mobile environment in which the subject disclosure may be implemented.
Figure 2:
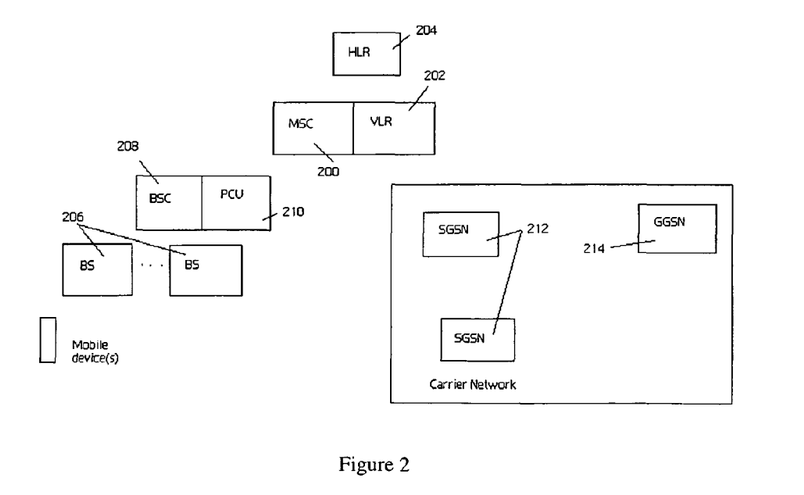
FIG. 2 illustrates components of transmission functionality where a mobile device is used in a wide area wireless network.
Figure 3:
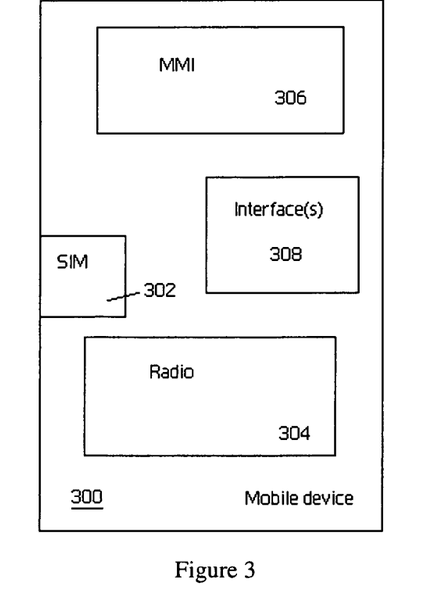
FIG. 3 is a representative mobile device.

FIG. 1 illustrates a known wireless device operating environment in which the present invention may be implemented. In a representative embodiment, a mobile device 100 is connectable (typically via WAP) to an identity provider/STS 102 through a transmission functionality 104. The transmission functionality 104 will vary depending on implementation. Thus, for example, where the wireless device operating environment is a wide area wireless network (e.g., a 2.5 G network), the transmission functionality 104 such as shown in FIG. 2 comprises one or more components such as: a mobile switching center 200 (MSC) (an enhanced ISDN switch that is responsible for call handling of mobile subscribers), a visitor location register 202 (VLR) (an intelligent database that stores on a temporary basis data required to handle calls set up or received by mobile devices registered with the VLR), a home location register 204 (HLR) (an intelligent database responsible for management of each subscriber's records), one or more base stations 206 (each a BS) (which provide radio coverage with a cell), a base station controller 208 (BSC) (a switch that acts as a local concentrator of traffic and provides local switching to effect handover between base stations), and a packet control unit 210 (PCU) (a device that separates data traffic coming from a mobile device). The HLR 204 also controls certain services associated with incoming calls. The mobile device is the physical equipment used by a subscriber. Typically, a mobile device 300, such as seen in FIG. 3, includes a subscriber identity module 302 (SIM), which is a smart card that carries subscriber-specific information, mobile equipment 304 (e.g., radio and associated signal processing devices), a man-machine interface 306 (MMI), and one or more interfaces 308 to external devices (e.g., computers, PDAs, and the like). The mobile device may also include a data store. Referring back to FIG. 2, in a typical "connected mode" use scenario, the mobile device connects to a base station (BS). Multiple base stations connect into base station controller (BSC). The HLR 204 typically manages authentication and controls certain other services associated with incoming calls. Voice traffic is sent from the BSC to the mobile device. The PCU separates data traffic coming from the mobile device. Data (as opposed to voice) traffic is managed by the operator's wireless data network. Thus, for example, typically the data traffic goes to a Serving GPRS Service Node (SGSN) 212. A carrier's network typically has multiple SGSNs. The SGSNs authenticate mobile users by querying the HLR. The SGSN 212 also manages data traffic, and it routes data traffic over the carrier's GPRS network to a Gateway GPRS Service Node (GGSN) 214. The GGSN 214 is a border router that routes traffic to and from the GPRS network into the public Internet. As a user moves across cells, the user becomes associated with different SGSNs. The SGSNs are responsible for managing the mobility of the user.

Figure 4:
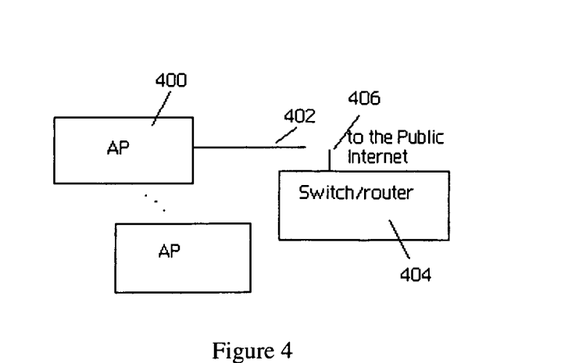
FIG. 4 illustrates components of transmission functionality where a mobile device is used in a wireless local area network.

FIG. 4 illustrates an alternate embodiment of the transmission functionality where the network is a wireless local area network. A typical wireless LAN is deployed as a "hotspot" where mobile device users are expected to frequent. A simple hotspot deployment typically comprises a wireless LAN 802.11 based access point (AP) 400 and provides connectivity into the Internet typically over a DSL, T1, or a leased line 402. A larger deployment may comprise multiple access points connected through Ethernet switches and a router (shown collectively as reference numeral 404) to the public Internet typically over a T1 or a leased line 406. The hotspots are typically managed and operated by wireless ISP's or wireless system integrators. Users with laptops or PDA's with 802.11 based network interface cards (NIC's) use an 802.11 wireless network to access the Internet.

As used herein, a "mobile device" is any existing mobile device or next generation proximity device that is capable of connecting to a network via a wireless transmission. More generally, and for the purposes described below, a mobile device may be generalized to be any device that is "disconnected" from the network; thus, it is sometimes referred to herein as a "disconnected device."

Returning back to FIG. 1, mobile device 100 connects to the network over a first communication channel 108. This connection facilitates a connected mode of operation, as is well-known in the prior art. In this mode, the mobile device can access one or more internal applications 110 that are executable on one or more machines and that provide one or more services on behalf of the network provider. In the alternative, the mobile device 100 can connect over the network (once again, in a connected mode) to one or more third party applications 112. A trust broker 115 provides an authentication service directly to the identity provider/STS 102, or indirectly to the third party application 112, such as through an STS 114 associated with the third party application. As also illustrated in FIG. 1, the mobile device 100 is connectable to a disconnected application 116, typically via a non-WAP based method (such as Bluetooth, IR-based communications, and the like), to provide a "disconnected mode" of operation. This connection is over a second communication channel 118. One of ordinary skill in the art will appreciate that channels 108 and 118 may be one and the same, depending for example on the availability of the network connectivity at a given time. The mobile device 100 may be considered to be operating in "connected" mode when the device is connected or connectable to a connected application via the first channel 108, and the device may be considered to be operating in "disconnected" mode when it is not connected or connectable to a connected application via the first channel 108 but is otherwise connectable to the disconnected application 110 via the second channel 118. An STS 120 is associated with the disconnected application 110.

More generally, a mobile device may also be considered to be operated in a "disconnected" mode from the identity provider itself. In this case, the mobile device may be deemed to be operating in an "identity provider-disconnected mode." This mode can occur when the mobile device is disconnected from a network or even if the mobile device remains connected to the network. An example of the latter case is where the mobile device is connected to a network but unable to access the identity provider. Thus, in one embodiment, an identity provider-disconnected mode also includes the scenario where the mobile device remains interconnected but moves to a different network provider, where access to the identity provider is not allowed.

As used herein, the "disconnected application" 110 is a computer program, process or module, or set of such components, that provide a given function, such as providing access to a facility, providing access to a resource, enabling purchase of a given product or service, providing a subscription to a service, or the like. The disconnected application may execute on a single machine or device, or it may be distributed across multiple machines, devices, programs, processes, execution threads, or the like. The STS 120, either alone or in combination with one or more other entities or devices, provides an authentication. As is well-known, authentication is the process of verifying a person's identity. As used herein, authentication may include authorization, which is the process of verifying that a known person has the authority to perform a certain operation.

Figure 5:
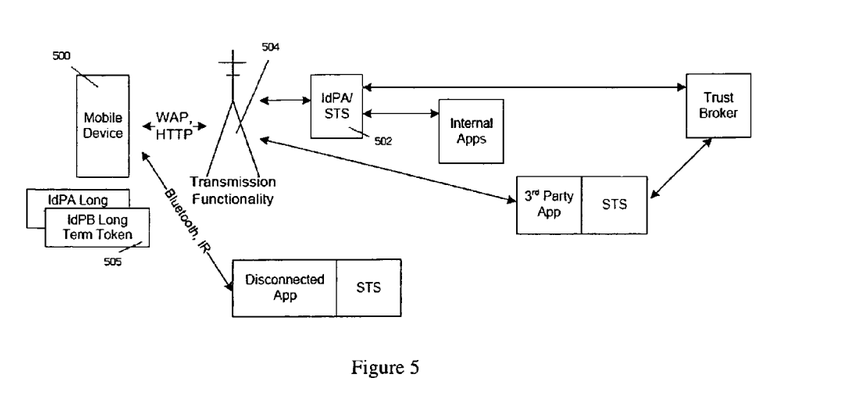
FIG. 5 illustrates how an identity provider/STS provides a mobile device with a long term token according to the subject disclosure.

According to one embodiment, and as illustrated in FIG. 5, the mobile device user obtains a "long term" token 505 from a given identity provider/STS 502, e.g., when the mobile device 500 is connected to the network via the transmission functionality 504. The token 505 is useful to facilitate identity and privilege assertion to other parties. In general, the token is used to assert the user's authenticated identity (and/or associated attributes) to service provider partners. Typically, the token is provided when the mobile device is turned on (or when the device roams into the network's coverage area) and the user authenticates to the identity provider. At this time, the identity provider/STS 502 provides the token to the mobile device 500, which then stores the token in a data store associated therewith. Preferably, the token is used to obtain authentication (or otherwise to assert the user's authenticated identity) when the mobile device is operating in an identity provider-disconnected mode environment. The duration of the token may be set in various timeframes, such as one (1) day, one (1) week, or the like. If desired, the timeframe may be defined by a "not-for-use before a first date and time" value together with a "not-for-use after a second date and time" value. A policy may be associated with the token. One or more attributes may be associated with a given policy to provide fine grain control over the token's validity. As one of ordinary skill will appreciate, the token is used by the mobile device 500 when the mobile device needs to provide a token (or an equivalent) to authenticate itself in connection with some identity provider-disconnected mode operation. This token is sometimes referred to herein as a "long term" token to contrast that it is usable (theoretically) during time periods when the mobile device is not then connected to the identity provider. Typically, the token is not used when the mobile device is operating in connected mode, i.e. when the mobile device is connected to the identity provider. In connected mode, the application typically is able to leverage the network to request from the identity provider a fresh token, e.g., as generated at request time for the use at the appropriate connected application. The token that is used in identity provider-disconnected mode as described herein may not be associated with the same level of privileges as provided with a one-time-use token generated and used in connected mode.

Figure 6:
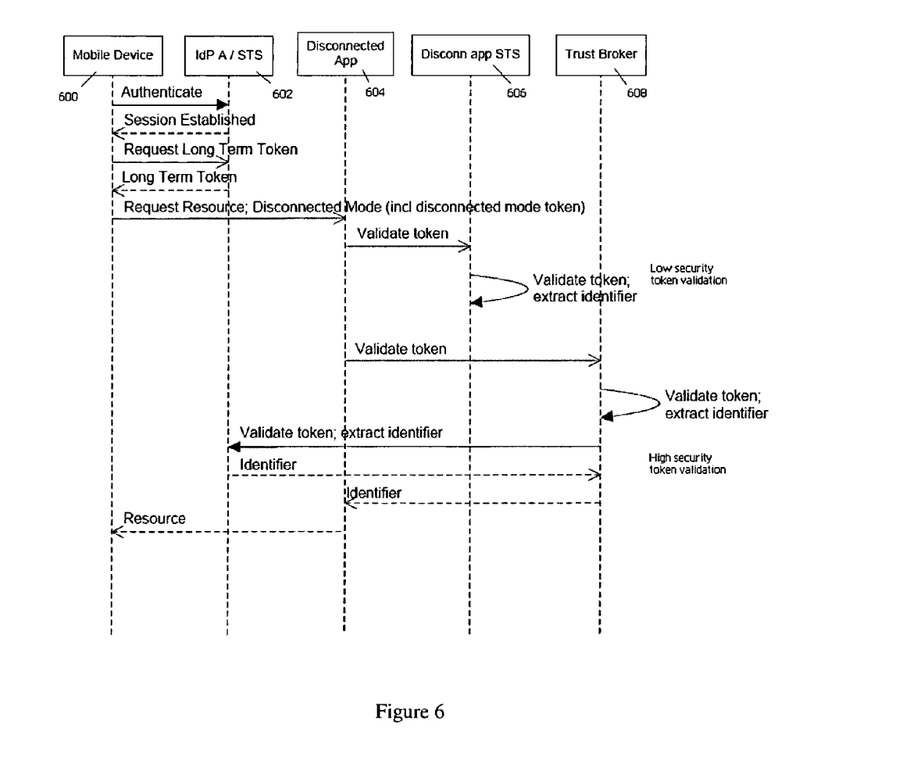
FIG. 6 is a messaging diagram illustrating how the mobile device uses the long term token to obtain a given authentication when operating in a disconnected mode according to the subject disclosure.

Referring now to FIG. 6, a messaging diagram is provided to illustrate a typical use case of the long-term token. The relevant entities are shown at the top of the diagram, and they include the mobile device 600, the identity provider/STS 602, the disconnected application 604, the disconnected application's associated STS 606, and a trust broker 608. The disconnected application 604 and associated STS 606 may be integrated or distributed. Starting from the top of the diagram and working down, it can be seen that the mobile device 600 first authenticates to the identity provider/STS 602 to establish a session. The mobile device 600 then makes a request to the identity provider/STS 602 for a long term token, which is then returned from the identity provider/STS 602. Now, assume that the mobile device is operating in identity provider-disconnected mode. At this point, the mobile device (and, in particular, some program or process executable thereon) makes a resource request to the disconnected application 604. The long term token is included with or otherwise associated with this resource request. As noted above, the "resource request" should be broadly construed to cover any type of access, use or other request, depending on the functionality provided by the disconnected application. In response, and depending on the trust relationship required, the disconnected application 604 makes a request to validate the token to one of: the disconnected application's own STS 606 or, in the alternative, to the trust broker 608. In the former case, validation typically is limited to the validation by the STS 606 of any digital signature or signatures on the presented token. This is a typical use scenario when the mobile device is used as part of a proximity solution based simply on validation of this digital signature. To this end, during the validation operation the disconnected application's STS 606 simply extracts an identifier and performs a conventional digital signature check in a known manner.

Alternatively, as also shown disconnected application 604 may present the token to the trust broker 608 directly. Typically, the trust broker is a third party entity that is capable of validating digital signatures as well as performing one or more other checks, such as certificate revocation list (CRL) checking on any digital certificates associated with the digital signature. In this latter case, the disconnected device is used as part of a more comprehensive proximity solution (e.g., access to an employer's premises and/or to particular areas within the premises) based on the ability to provide more advanced token validation. This scenario also supports lower-valued transactions (e.g., purchase of an item from a vending machine) based on the trust relationship with the token issuer 602 with the expectation that the issuer will honor the request.

In particular, and as illustrated in the lower portion of the messaging drawing of FIG. 6, the trust broker may interact with the original token issuer (identity provider/STS 606) by making an explicit validation request to the STS 606, passing the token that was received from the disconnected application 604. In this case, the token issuer performs additional checking (e.g., is the mobile device actually disconnected, has the device been shut down for some reason, or the like) before returning to the trust broker 608 more detailed information about the device and the device user's status. This scenario allows for higher valued/higher security requirement transactions, as the issuer (identity provider/STS 602) of the long term token is contacted to provide a validation of the token (received from the disconnected application 604) as well as a validation of the user/device possessing the token. This functionality supports higher valued transactions (e.g., purchasing of fuel for an automobile) based on the knowledge that the identity provider/STS has been contacted to validate the token in the context of the request in which the token was presented.

The present invention is advantageous as it does not require the mobile device itself to generate the token. In an alternate embodiment, the disconnected device may participate in the generation of the token, but typically this will not be the case. As a consequence, in one embodiment, the trust relationship between the disconnected application and the mobile device is limited to the channel over which the token is presented. A more significant trust relationship, if required, need only exist between the identity provider/STS and the trust broker, or between the trust broker and the disconnected application.

As used herein, the token is issued by an identity provider/STS mechanism; this is not a limitation however. More generally, the present invention envisions that the token (or, more generally, the data string that facilitates authentication) is provided by any issuing device or issuer.

Although not meant to be limiting, the present invention may be implemented in the context of a federated heterogeneous computing environment, such as described in U.S. Publication No. 2006/0021018, filed Jul. 21, 2004. As described there, a federated heterogeneous environment allows enterprises to provide a single-sign-on experience to a user. In such an environment, a user is able to authenticate to a first domain and then have that first domain provide the appropriate assertions to each downstream domain that might be involved in a transaction. These downstream domains need to be able to understand and trust authentication assertions and/or other types of assertions, even though there are no pre-established assertion formats between the first domain and these other downstream domains. In addition to recognizing the assertions, the downstream domains need to be able to translate the identity contained within an assertion to an identity that represents the user within a particular domain, even though there is no pre-established identity mapping relationship.

A federation is a set of distinct entities, such as enterprises, organizations, institutions, etc., that cooperate to provide a single-sign-on, ease-of-use experience to a user; a federated environment differs from a typical single-sign-on environment in that two enterprises need not have a direct, pre-established, relationship defining how and what information to transfer about a user. Within a federated environment, entities provide services which deal with authenticating users, accepting authentication assertions (e.g., authentication tokens) that are presented by other entities, and providing some form of translation of the identity of the vouched-for user into one that is understood within the local entity. Federation eases the administrative burden on service providers. A service provider can rely on its trust relationships with respect to the federation as a whole; the service provider does not need to manage authentication information, such as user password information, because it can rely on authentication that is accomplished by a user's authentication home domain or an identity provider.

A federated entity may act as a user's home domain, which provides identity information and attribute information about federated users. An entity within a federated computing environment that provides identity information, identity or authentication assertions, or identity services is termed an identity provider. Other entities or federation partners within the same federation may rely on an identity provider for primary management of a user's authentication credentials, e.g., accepting a single-sign-on token that is provided by the user's identity provider; a domain at which the user authenticates may be termed the user's (authentication) home domain. An identity provider is a specific type of service that provides identity information as a service to other entities within a federated computing environment. With respect to most federated transactions, an issuing party for an authentication assertion would usually be an identity provider; any other entity can be distinguished from the identity provider. Any other entity that provides a service within the federated computing environment can be categorized as a service provider. Once a user has authenticated to the identity provider, other entities or enterprises in the federation may be regarded as merely service providers for the duration of a given federated session or a given federated transaction.

Thus, in the context of FIG. 1, the trust broker 115 (which may be trust proxy, a trust proxy server, or the like) provides a trust service that establishes and maintains a trust relationship between or among two or more entities in a federation. The identity provider/STS 102 is associated with the federation; typically, it is capable of accepting and validating many different authentication credentials, including traditional credentials (such as a username and password combinations and Kerberos tickets), as well as federated authentication token formats, including authentication tokens produced by a third party. The identity provider/STS may allow the acceptance of an authentication token as proof of authentication elsewhere. Preferably, the identity provider/STS is also able to process attribute tokens or tokens that are used to secure communication sessions or conversations, e.g., those that are used to manage session information in a manner similar to an SSL session identifier.

Typical approaches to single sign-on in a federated environment require a connection (connected mode operation). Normally, disconnected applications or functionality cannot be used in a federated environment, because typically browser-based (or passive client) SSO approaches require connections to the identity provider to complete the federated SSO protocol. According to the present invention, however, as an important piece of information that is exchanged in these process flows (as part of identifying a user) is a token (and, preferably, an SSO token), the mobile device must be able to present (or broker the presenting of) this token in both connected and disconnected mode. This requires either that the mobile device be able to generate a token when in disconnected mode or, better yet, that the mobile device possess a previously-issued token that can be used as required when in disconnected mode. To this end, in the approach preferred herein, when a mobile device is turned on and the user authenticates to its identity provider (within or without the federated environment), the mobile device obtains the long term token, which can then be used to facilitate a given authentication when the device operates in disconnected mode.

The techniques described herein provide numerous advantages. Foremost, the above-described techniques enable a mobile device user to obtain authentication to perform a given operation when operating in disconnected mode. Moreover, because the token preferably is issued by the identity provider/STS (or equivalent), as opposed to being generated on the device itself, the STS (or other device) may cancel the token upon a given occurrence to prevent the device from accessing the disconnected application or otherwise carrying out the disconnected mode operation. This is quite useful in the context of preventing use by an unauthorized third party of a stolen mobile device. In particular, and according to another feature of the present invention, preferably the STS cancels the long-term token upon receipt of a notification that a user's mobile device has been stolen or is otherwise lost. This ensures that the device cannot be used to facilitate a mobile device-aided function in disconnected mode without the authorized user's authority or consent.

The subject matter described herein can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, as noted above, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

One or more of the above-described functions may also be implemented as a service.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions described may be combined or shared in given instructions, program sequences, code portions, and the like.

The invention claimed is:

1. A method to enable a mobile device user to perform a mobile device-aided operation, comprising:
    with the mobile device in a connected mode in which it is connected to an identity provider, receiving and storing at the mobile device a token that is useable by the mobile device to obtain an authentication when the mobile device is operating in an identity provider-disconnected mode in which it is disconnected from the identity provider, wherein the token includes a time dependency that defines when the token is valid for use and is one of: a defined time period, and a timeframe that is defined relative to a given future date and time;
    while the mobile device is operating in the identity provider-disconnected mode, causing the mobile device to present the token to enable the mobile device to obtain the authentication, wherein presenting the token also verifies that the mobile device is operating in the identity-provider disconnected mode; and
    upon receipt of the authentication, performing the mobile device-aided operation.

2. The method as described in claim 1 wherein the mobile device operates in the identity provider-disconnected mode when the mobile device cannot access an identity provider.

3. The method as described in claim 2 wherein the mobile device can access a network provider.

4. The method as described in claim 1 wherein the token is a single sign-on (SSO) token is associated with a federated computing environment single sign-on (F-SSO).

5. The method as described in claim 1 further including canceling the token.

6. The method as described in claim 1 wherein the token is presented by the mobile device to a given application.

7. The method as described in claim 1 wherein the step of presenting the token also validates a digital signature associated with the token.

8. The method as described in claim 1 wherein the token is generated by an issuing device.

9. A method, using a mobile device, to enable a mobile device user to perform a mobile device-aided operation, comprising:
    with the mobile device in a connected mode of operation, receiving and storing at the mobile device a data string, the data string useable to obtain an authentication of the mobile device user, wherein the data string is a security token that includes a time dependency that defines when the token is valid for use and is one of: a defined time period, and a timeframe that is defined relative to a given future date and time; and
    with the mobile device in an identity provider-disconnected mode of operation distinct from the connected mode of operation, having the mobile device present the data string to an application to enable the mobile device to attempt to obtain the authentication;
    upon obtaining the authentication, and upon verifying the mobile device is operating in the identity provider-disconnected mode of operation, performing the mobile device-aided operation using the application.

10. The method as described in claim 9 wherein the identity provider-disconnected mode of operation is a mode in which the mobile device cannot access an identity provider.

11. The method as described in claim 10 wherein the mobile device can access a network provider when the mobile device is operating in the identity provider-disconnected mode of operation.

12. The method as described in claim 9 wherein the security token enables a single sign-on operation.

13. The method as described in claim 9 wherein the authentication includes validating the data string.

14. A method, using a mobile device, to enable a mobile device user to perform a mobile device-aided operation, comprising:
    with the mobile device in a connected mode of operation, receiving and storing at the mobile device a token, the token useable to assert an identity or privilege associated with the mobile device user, wherein the token includes a time dependency that defines when the token is valid for use and is one of: a defined time period, and a timeframe that is defined relative to a given future date and time; and
    with the mobile device in an identity provider-disconnected mode of operation, causing the mobile device to present the token to an application to enable the mobile device user to perform the mobile device-aided operation using the application, wherein presenting the token also verifies that the mobile device is operating in the identity-provider disconnected mode.

15. The method as described in claim 14 further including: upon a given occurrence, canceling the token.

16. A mobile device, comprising:
a radio;
a man-machine interface; a network interface;
a processor;
a computer-readable medium having processor-executable instructions for performing the following method steps:
with the mobile device in a connected mode, receiving and storing a token that is useable to assert an identity or privilege associated with a user of the mobile device; and
with the mobile device verified as operating in an identity provider-disconnected mode of operation, and provided the token is valid, causing the mobile device to present the token to enable the mobile device user to perform a mobile device-aided operation, wherein validity of the token is determined by evaluating a time dependency associated with the token that defines when the token is valid for use and is one of: a defined time period, and a timeframe that is defined relative to a given future date and time.

17. An access control system having an associated token issuing device, the system comprising:
an application; and
software executable in a mobile device at a first time when the mobile device is operating in a first mode of operation to receive and store in the mobile device a token, wherein the token is generated by the token issuing device and is useable, at a second time distinct from the first time, to obtain an authentication of a mobile device user, wherein the token includes a time dependency that defines when the token is valid for use and is one of: a defined time period, and a timeframe that is defined relative to a given future date and time;
the software being further executable at the second time when the mobile device is verified as operating in an identity provider-disconnected mode of operation to cause the mobile device to present the token to attempt to obtain the authentication;
the software being further executable upon obtaining the authentication, and with the mobile device in the identity provider-disconnected mode of operation, to enable the mobile device user to perform a mobile device-aided operation.

* * * * *